Dec. 6, 1938.         A. D. ROLLINS         2,139,466
ANNUNCIATOR
Original Filed Nov. 6, 1926    5 Sheets—Sheet 1
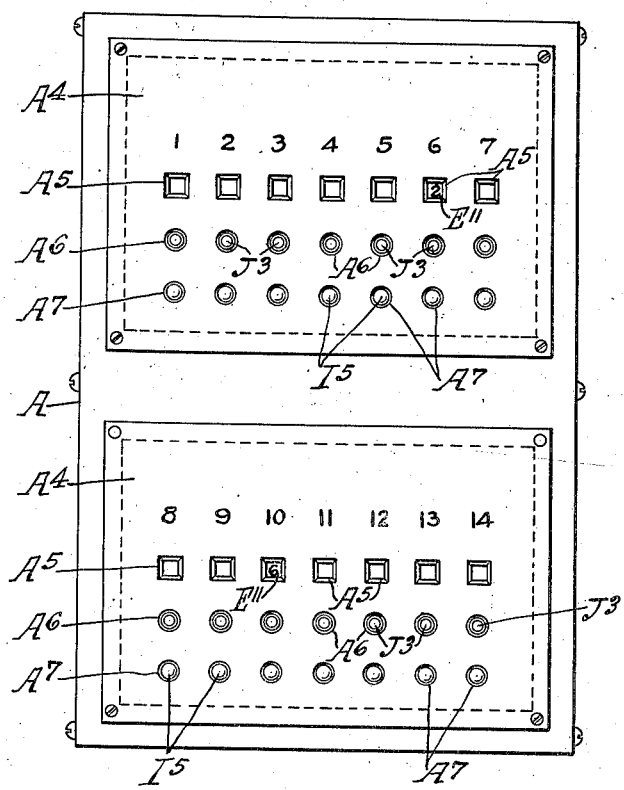
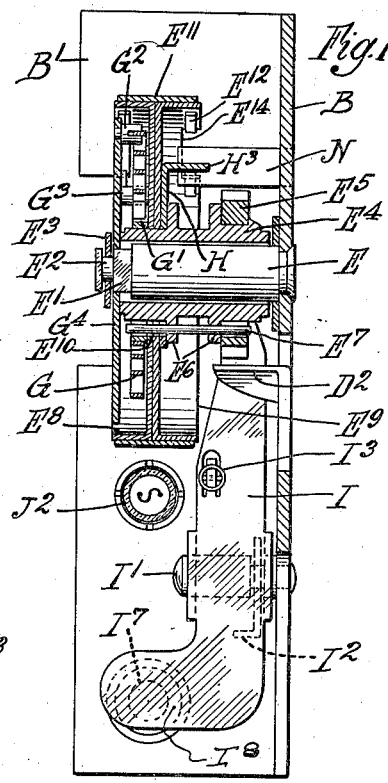
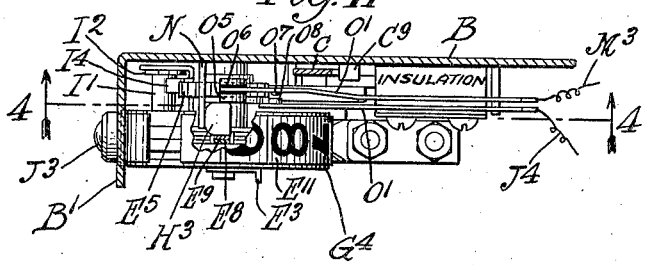
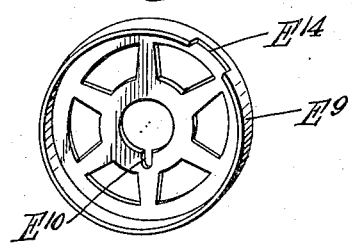
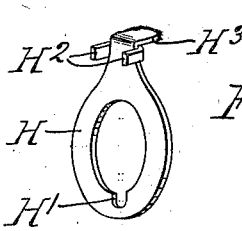
Inventor
Arch D. Rollins
by Parker & Carter
Attorneys Dec. 6, 1938.  A. D. ROLLINS  2,139,466
ANNUNCIATOR
Original Filed Nov. 6, 1926  5 Sheets—Sheet 2

Inventor
Arch D. Rollins
by Parker & Carter
Attorneys

Dec. 6, 1938.  A. D. ROLLINS  2,139,466
ANNUNCIATOR
Original Filed Nov. 6, 1926  5 Sheets-Sheet 3
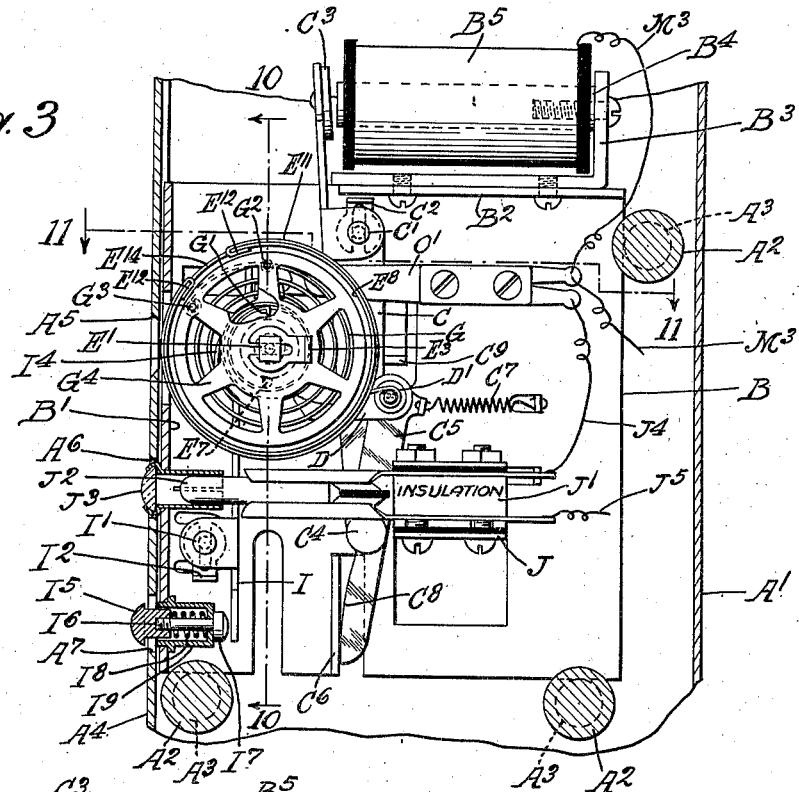
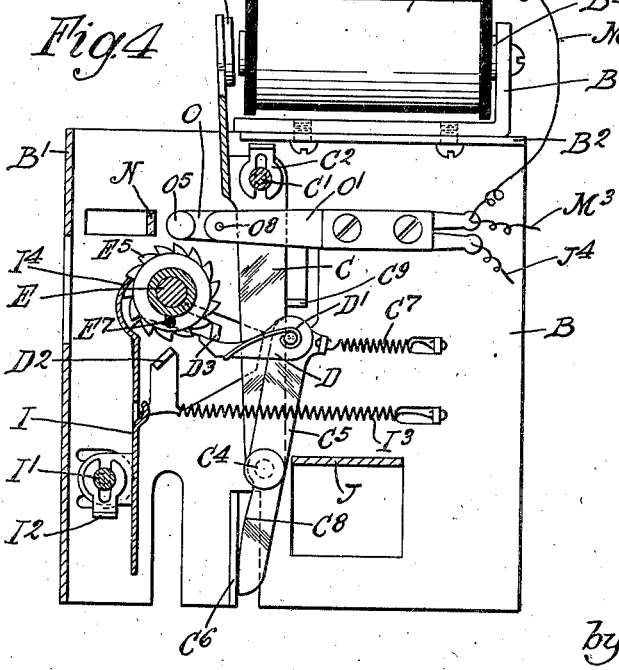
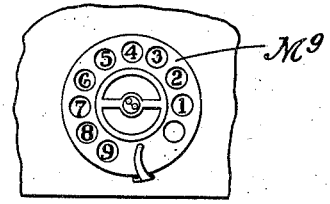
Inventor
Arch D. Rollins
by Parker & Carter
Attorneys.

Dec. 6, 1938.   A. D. ROLLINS   2,139,466
ANNUNCIATOR
Original Filed Nov. 6, 1926   5 Sheets-Sheet 4
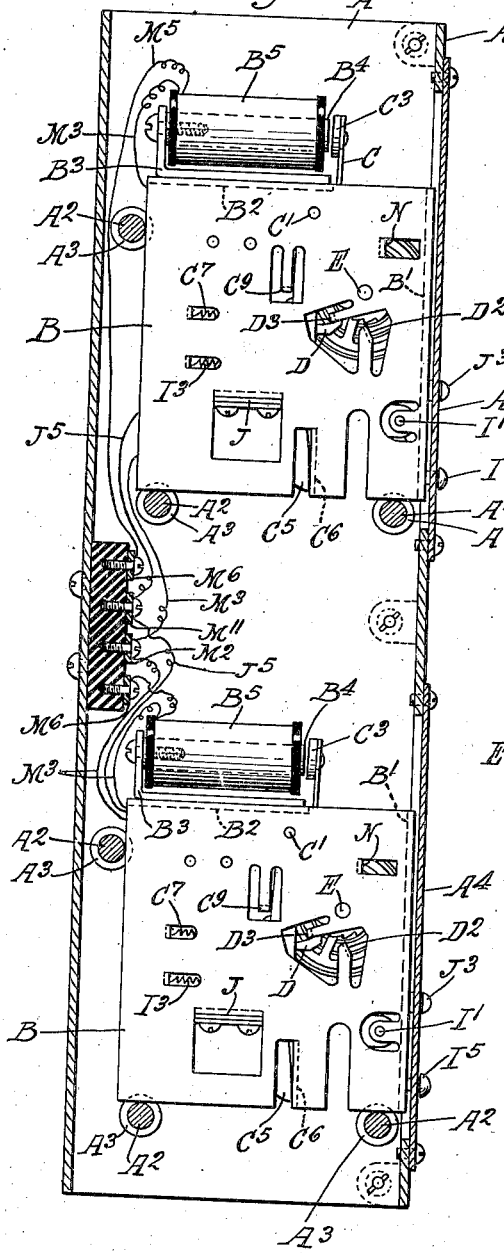
Inventor
Arch D. Rollins
by Parker + Carter
Attorneys.

Patented Dec. 6, 1938

2,139,466

UNITED STATES PATENT OFFICE 2,139,466

ANNUNCIATOR

Arch D. Rollins, Chicago, Ill., assignor, by mesne assignments, to Temporator Company, Chicago, Ill., a corporation of Illinois Original application November 6, 1926, Serial No. 146,613. Divided and this application September 15, 1934, Serial No. 744,232

3 Claims. (Cl. 177—326)

My invention relates to an improvement in annunciators and particularly to an annunciator system adaptable for use in factories or organizations where a relatively large number of individuals are working at generally fixed points in a factory or building. One purpose of my invention is to provide an annunciator system whereby the employees can call the central office. Another object is the provision of annunciator means whereby the individual employees may not merely call the central office but may indicate to the central office, within fair range, what their need is. Another object is the provision of a warning system whereby individuals working at scattered points may quickly signal for held or assistance or cooperation to a central office. Other objects will appear from time to time in the course of the specification and claims.

This application is a division of my original application Serial No. 146,613 filed November 6, 1926, which is now Patent 1,973,727, issued September 18, 1934.

I illustrate my invention more or less diagrammatically in the accompanying drawings wherein:

Figure 1 is a front elevation of the indicator portion of the annunciator;

Figure 3 is a section on the line 3—3 of Figure 2;

Figure 4 is a section on the line 4—4 of Figure 11;

Figure 5 is a detailed view of an indexing dial;

Figure 6 is a section similar to Figure 4 but however showing the pawl in engagement with a stop;

Figure 7 is a section on the line 7—7 of Figure 2;

Figure 8 is a detail of the cover of one of the indicator wheels;

Figure 9 is a perspective view of the arm shown for example in Figures 4 and 6;

Figure 10 is an enlarged section on the line 10—10 of Figure 3;

Figure 11 is a section on the line 11—11 of Figure 3;

Figure 12 is a perspective view of a portion of a wheel or reel to which one of the covers shown in Figure 8 is attached;

Figure 13 is a perspective of a switch brake, or stop, and

Like parts are illustrated by like symbols throughout the specification and drawings.

Figure 2:
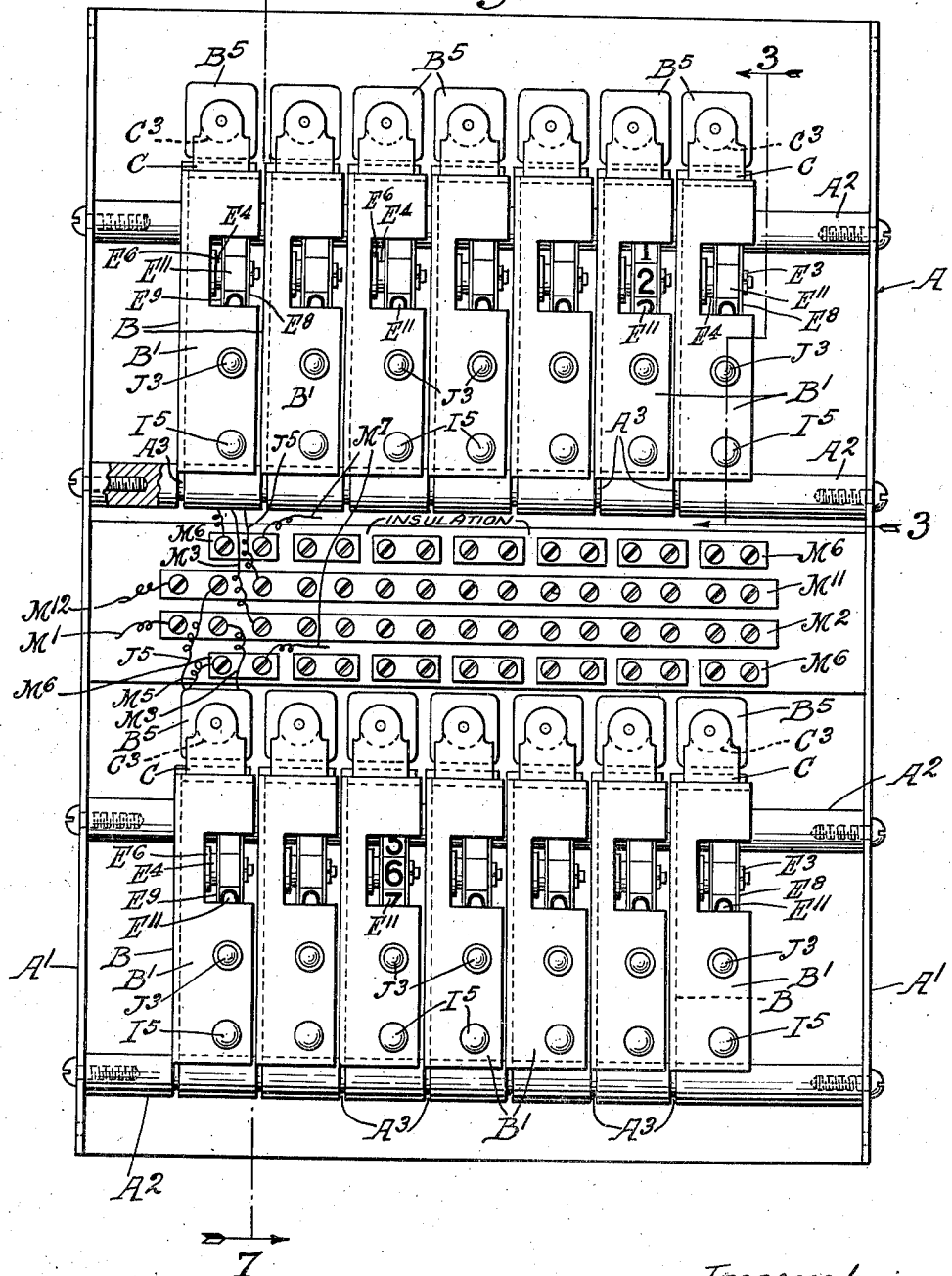
Figure 2 is a similar view on an enlarged scale with the front plate removed.

Referring to the central annunciator structure shown for example in Figures 1, 2 and 7, A is any suitable housing or enclosure having the side walls $A^1$ and the transverse supporting and spacing pins $A^2$ each slotted at a plurality of points as at $A^3$. In the mechanism herein shown I employ an annunciator system having two banks of annunciating mechanisms each such bank being mounted on a pair of the transverse pins $A^2$, and limited as to inward movement by a third of said pins $A^2$, as shown in Figure 7. I need, however, describe the details of but one of said banks. $A^4$ are any suitable cover plates secured to the front of the main housing A and each provided with three rows of apertures, the upper square apertures $A^5$ and the lower round apertures $A^6$, $A^7$. Above each square aperture $A^5$ I may put any suitable indicating symbol, relating to the source of the impulses which position the below-described indicator mechanism behind the various square apertures.

Each bank of annunciator mechanisms consists of a plurality of independent and separately removable units.

Each such unit includes a supporting plate B adapted to engage and be positioned by the slots $A^3$ in the various supporting pins $A^2$. At the forward end of the unit the plate B is bent at right angles as at $B^1$ and the most of the various below-described stops and supporting members are punched or stamped out of the plates B. Thus $B^2$ is a shelf bent from the top of the plate B to which is bolted the magnet support $B^3$ to which is secured the core $B^4$ and the magnet coil $B^5$.

C is a lever pivoted as upon the pin $C^1$ and kept in position thereupon for example by the spring washer $C^2$. Its upper arm terminates in a disc $C^3$ opposed to the magnet core $B^4$ within the magnet coil $B^5$. To its lower arm, as at $C^4$, is pivoted the lever $C^5$ the lower arm of which has the curved face $C^8$ to engage the ledge or stop $C^6$ formed in the plate B. The upper arm of the lever $C^5$ is engaged by the tension spring $C^7$ which normally moves it to the right, and the lever C comes against the stop $C^9$ as shown in Figure 4.

When the parts are in the position shown in Figures 3 and 4 the extreme end of the curved face $C^8$ of the lower arm of the lever $C^5$ is in contact with the ledge $C^6$. The result is a greater leverage at the beginning of the movement of the lever C, and the effective length of the lever decreases in proportion to the increasing strength of the magnetic force of the magnet $B^5$ and its core $B^4$, acting upon the disc $C^3$ of the lever C, as shown for example in Figure 6. As the power of the magnet increases the lever decreases in length.

At its upper extremity is pivoted the dog D which is normally urged in clockwise direction for example by the spiral spring $D^1$. $D^2$, $D^3$ are fixed stops formed in the plate B and adapted to limit the movement of the dog D.

E is a fixed pin riveted to the plate or frame B and terminating in a square portion $E^1$ channeled as at $E^2$ to receive the spring washer $E^3$ which holds in position the various members mounted about the pin E. $E^4$ is a collar rotatable about the pin on which is mounted a ratchet wheel $E^5$. $E^6$ are performated flanges on said collar adapted to receive the pin $E^7$ whereby the ring of ratchet teeth $E^5$ and the various members below-described are held against rotation in relation to the collar. $E^8$, $E^9$ are a pair of wheels or perforated discs mounted on said collar and notched as at $E^{10}$ to engage the pin $E^7$. There are mounted back to back, as shown in Figure 10 and are surrounded by the indicator plate $E^{11}$, as shown in Figure 8 the ears $E^{12}$ at the ends thereof bent about the ledges formed by the notches $E^{14}$ in the wheels.

G is a spiral spring the inner end of which is caught in the slotted washer $G^1$ held against movement by the pin $E^7$. The opposite end of the spring is locked upon the pins $G^2$, $G^3$ upon the apertured disc $G^4$ which is mounted upon the squared portion $E^1$ of the pin E and thus fixed against rotation.

H is a switch brake member mounted about the sleeve $E^4$ and notched as at $H^1$ to engage the pin $E^7$. It is provided with the lugs $H^2$ which pass through the apertures in the wheels $E^8$, $E^9$ and with a stop lug $H^3$ bent in the opposite direction. The lug $H^3$ is preferably formed with rounded curves at its face in order to insure proper cooperation with the spring contact O, in a manner to be hereinafter explained.

I is a stop lever pivoted upon the pin $I^1$ and held thereupon by the spring washer $I^2$. It is urged, by the tension on the spring $I^3$ to the right as shown in Figure 4 and is provided with a curved upper end $I^4$ adapted to engage the faces of the ratchet teeth $E^5$, normally preventing counterclockwise movement of the ratchet. The lever I is controlled by a push button $I^5$ threaded on a stem $I^6$ terminating in the enlarged head $I^7$. The spring $I^8$ normally thrusts the stem to the left as shown in Figure 3, holding the head $I^7$ against the exterior of the casing $I^9$. It will be noted that the lower end of the lever I, adjacent to the push button $I^5$, is offset laterally from the longitudinal axis of the lever, in order to provide for the proper vertical alignment of the character display window $A^5$, the signal light aperture $A^6$, and the push button aperture $A^7$ on the front panel $A^4$ of the casing.

J is a ledge formed on the plate or frame B adapted to support any suitable incandescent light socket $J^1$ herein shown as of insulating material. $J^2$ is an incandescent light aligned with the glass or lens $J^3$. It will be understood that each push button $I^5$ is positioned in an aperture $A^7$ and each light $J^2$ is positioned behind an aperture $A^6$ as shown in Figure 1. The indicating symbols on the indicator covers $E^{11}$ are aligned with the square apertures $A^5$.

Figure 14:
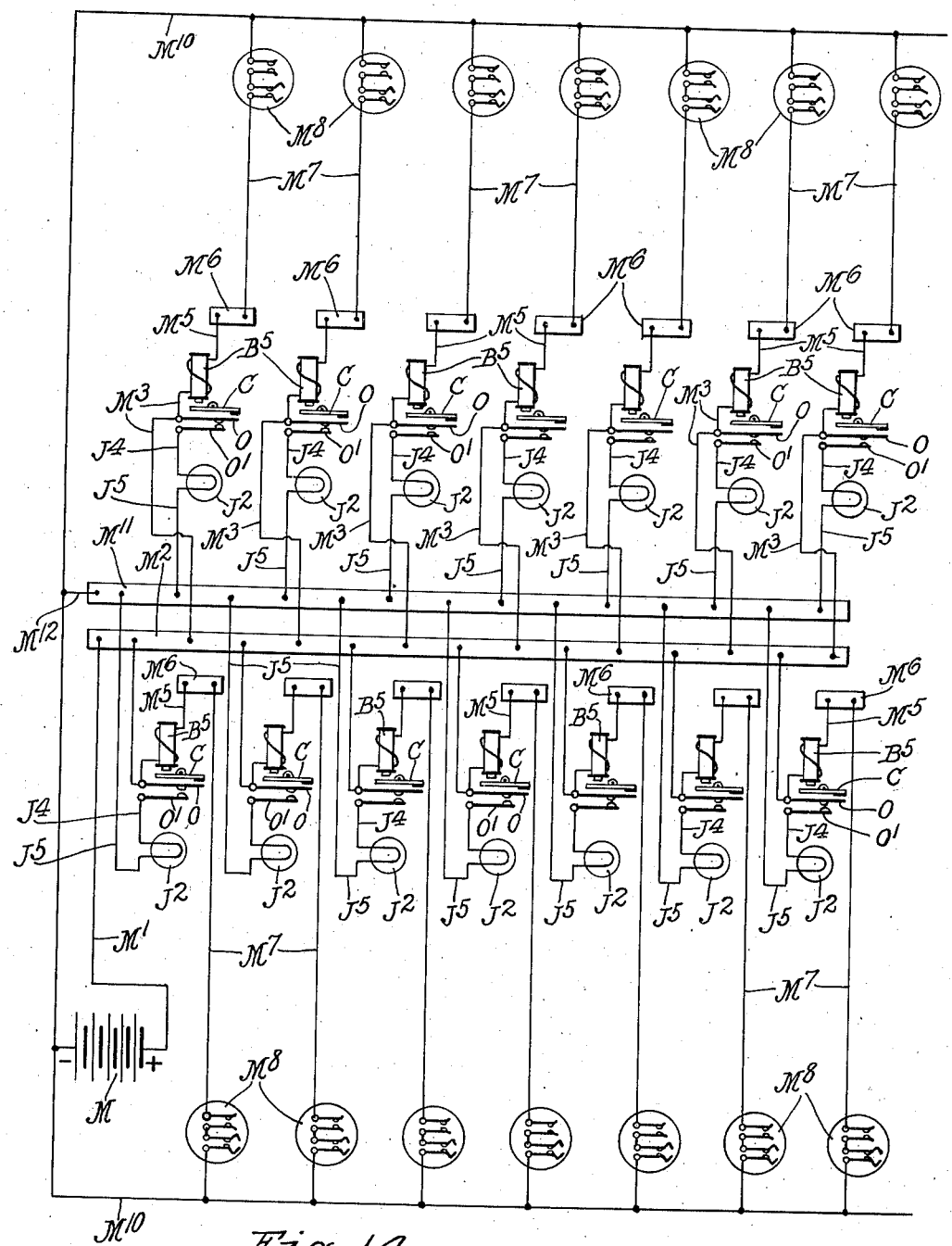
Figure 14 is a diagrammatic view of the entire installation, showing the electric circuits.

Referring to the schematic circuit diagram of Figure 14, and the electric connections as shown in Figure 2 and other figures, M is any suitable source of electric power. $M^1$ is indicated as a lead from the positive terminal of said power source to a bar or strip or conductor $M^2$ extending from side to side of the entire indicator. Since the individual circuits are identical but one unit will be described. $M^3$ is a wire extending from the strip $M^2$ to the magnet coil $B^5$. The line $M^5$ extends from said magnet coil to the short bar $M^6$ and the circuit is continued thence by the wire $M^7$ to any suitable electric indexing mechanism $M^8$, the details of which form no part of the present invention. Suffice it to say that I provide the indexing dial $M^9$, diagrammatically illustrated in Figure 5, and any suitable mechanism controlled thereby for making and breaking the circuit which extends by the line $M^{10}$ to the negative pole of the power source. Whereas setting the dial $M^9$ to Number 1, for example, will make and break the circuit but once, setting it to 9 will make and break the circuit nine times. As the circuit is made by the rotation of the indexing dial the magnet coil $B^5$ is excited, and the pin $B^4$ is magnetized and draws to it the upper arm of the lever C.

When the lever C is thus rotated it closes the circuit diagrammatically shown in Figure 14 as passing through the "off-normal" switch or contact members O $O^1$ and thence to the incandescent light $J^2$ by the wire $J^4$ and back by the line $J^5$ to the strip $M^{11}$ and thence by the line $M^{12}$ to the negative pole of the power source.

Translating this schematic description, to the detailed mechanism of Figures 3 and 4 for example, the magnetization of the pin $B^4$ rotates the lower arm of the lever C to the left. The lower arm of the lever $C^5$ engages the stop $C^6$ and the upper arm is thereby rotated in counter-clockwise direction in response to movement of the lever C. The dog D is thereby moved to the left as shown in Figure 6. Since the stop $D^3$ limits its upward movement in response to the springs $D^1$, it engages one of the ratchet teeth $E^5$ and rotates the ratchet wheel in clockwise direction. Its forward movement is limited by the stop $D^2$ and the parts are so proportioned that a single movement of the lever C will rotate the ratchet, and thus the indicator wheels $E^8$ $E^9$ and the indicator plate or cover $E^{10}$ a distance equivalent to one of the numerals on said strip $E^{10}$. As soon as the circuit is broken at the indexing point the lever C is released, the lever $C^5$ is withdrawn to the right by the spring $C^7$ and the ratchet is engaged by the stop $I^4$ and held against rearward movement. If, at the indexing point, the circuit is broken nine times, then obviously the ratchet will be contacted nine successive times by the dog D and the indicator strip will be advanced nine times so that the Figure 9 will be positioned behind the square aperture $A^5$.

At the first closure of the circuit and the first movement of the ratchet wheel by contact of the dog D the stop $H^3$ is moved in clockwise direction and disengages the pin $O^5$ on the spring contact O. It will be understood that the end of the spring O is insulated by the insulating material $O^6$. The movement of the stop $H^3$, by releasing the spring O permits the contact $O^7$ on the spring O to engage an opposed contact or projection $O^8$ on the opposite spring $O^1$, to close the signal circuit connected thereto whenever the character wheel associated with said stop is moved to "off-normal" or non-indicating position.

It will be realized that whereas I have shown a practical and operative device and arrangement that nevertheless many changes might be made in the size, shape, number, location and disposition of parts without departing from the spirit of my invention and that I wish my description and drawings to be taken therefore as in a broad sense illustrative.

The use and operation of my invention are as follows:

I provide a centrally located indicator member as shown in Figure 1 which may be located for example in the office of a factory and which is under the observation of some operator. Each numbered column, consisting of an aperture $A^5$ and electric light aperture $A^6$ and a reset button $I^5$ is connected with a given point, for example with a machine or work bench in a factory. Behind each aperture is an indicator drum on which may be any suitable number of symbols. I show in Figure 8 a drum plate having ten symbols, each symbol may by agreement be understood to relate to a given and predetermined need of the person or operator signaling and of course the code agreed upon may if desirable be differentiated for different parts of a plant. If for example the symbol 1 denotes the need of an electrician or a repair man, or a technical expert of some kind, the person observing the indicator will note the need and send the required expert to the place where he is required. When the signal light in the aperture $A^6$ flashes on the attention of the operator is called, and after sending the expert or other party whose attendance was signalled for, the operator presses the reset button $I^5$, which extinguishes the light and returns the dial to blank position. The result of such an indicator system is the elimination of an enormous amount of running about and waste motion and a great reduction of the number of trips which need be made by employees, and a very large elimination of the use of messengers or call boys and the like.

I claim:

1. In a central station for grouped annunciators, a supporting structure including a plurality of spaced bars each provided with transversely aligned slots formed within said bars, and an indicating unit removably supported upon said bars, said unit including a plate having an edge dimensioned to fit snugly within the slots of said bars whereby to definitely locate the unit upon the supporting structure.

2. In a central station for grouped annunciators, a supporting structure including a plurality of spaced longitudinally extending bars provided with transversely aligned slots, there being at least three of said bars, two of said bars being positioned to lie in a common substantially horizontal plane and another of said bars being disposed above said plane and rearwardly of said other bars, and an indicating unit removably supported upon said bars, said unit including a plate having an edge dimensioned to fit snugly within the slots of said bars whereby to definitely locate the unit upon the supporting structure.

3. In a central station for grouped annunciators, a supporting structure including a plurality of spaced longitudinally extending bars provided with a plurality of sets of transversely aligned slots, there being at least three of said bars, two of said bars being positioned to lie in a common substantially horizontal plane and another of said bars being disposed above said plane and rearwardly of said other bars, and an indicating unit removably supported upon said bars, said unit including a side plate having an edge thereof exposed on two adjacent sides thereof and dimensioned to fit snugly within the slots of said bars whereby to definitely locate the unit upon the supporting structure.

ARCH D. ROLLINS.